Aug. 31, 1943.  J. D. LANGDON  2,328,382
FLEXIBLE CHECK VALVE AND VACUUM BREAKER
Filed Oct. 8, 1941
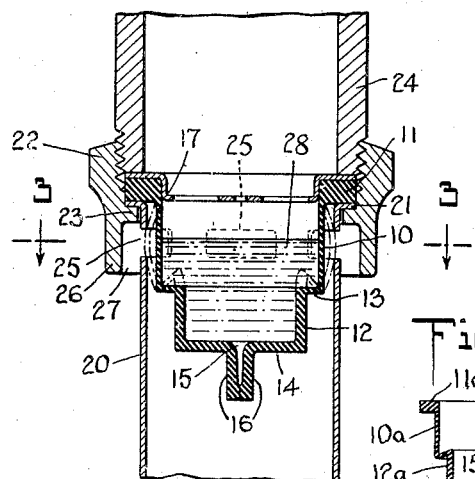
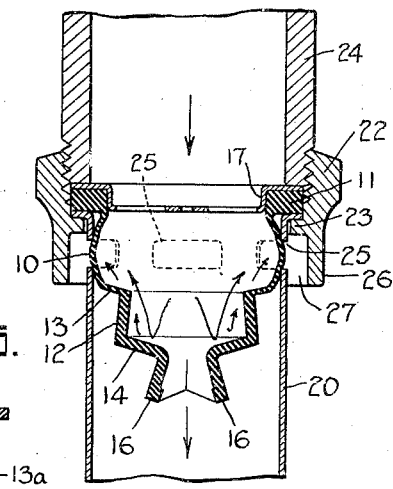
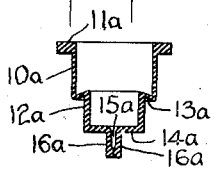
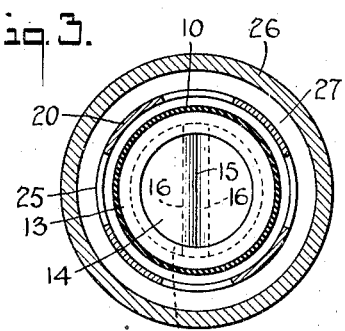
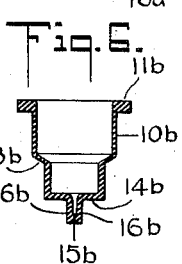
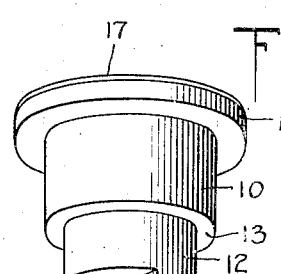
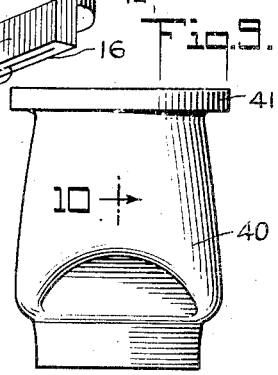
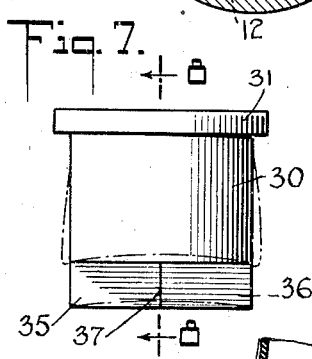
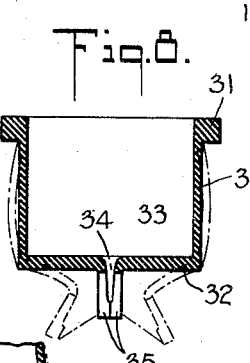
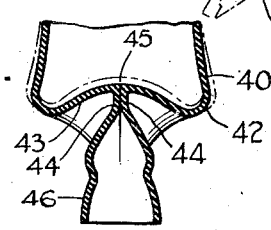
INVENTOR
Jesse D. Langdon
BY *Henry J. Lucke*
HIS ATTORNEY Patented Aug. 31, 1943

2,328,382

UNITED STATES PATENT OFFICE 2,328,382

FLEXIBLE CHECK VALVE AND VACUUM BREAKER

Jesse D. Langdon, Los Angeles, Calif.

Application October 8, 1941, Serial No. 414,051

8 Claims. (Cl. 277—20)

This invention relates to flexible check valves of sleeve formation, and to valved devices wherein such flexible sleeve check valves combine with other structural elements to provide new results.

Sleeve check valves formed in accordance with the invention from flexible material, such as rubber, which is capable of resuming normal shape after being deformed, are double acting in function; that is, they accomplish, in suitable valved devices or piping systems with which they are associated, checking of back-flow in two different ways. They check back-flow through themselves into the supply portions of the valved devices or piping systems, and, also, check back-flow around themselves into portions of the valved devices or piping systems which lie intermediate their lengths.

This double-acting feature of flexible sleeve check valves formed in accordance with the invention is especially useful in connection with vacuum breaking devices for plumbing systems wherein it is desired to not only prevent back-flow of contaminated water from outlet fixtures into the supply piping under conditions of suction in such supply piping, or otherwise, but to also admit air into the systems between the outlet fixtures and the back-flow-preventing devices so as to dissipate any suction-causing vacuums should the check valves for any reason fail to function properly. Because of their double-acting characteristics, flexible sleeve check valves of the presently disclosed type, when combined with suitable elements to form vacuum breaking devices, are capable of closing and of preventing back-flow into the supply portions of the systems under vacuum conditions existing in such supply portions, without closing off the air ports or vents of the vacuum breaking devices, and are capable of closing off such air ports or vents under conditions of actual back-flow, due to causes other than suction, while still preventing back-flow into the supply portions of the systems. They also close off the air ports or vents during normal flow through the plumbing systems. Thus, all desired results are accomplished without undesirable spurting and flow outwardly through the air ports or vents of the vacuum breaking devices.

A principal object of the invention, therefore, is to provide a flexible sleeve check valve which will be double acting, in that it will prevent back-flow therethrough as well as therearound.

Another principal object is to provide a vacuum breaking device for plumbing systems which will prevent back-flow therethrough and provide vacuum-breaking air vents effective when required, but closed off when not required so as to eliminate undesirable spurting and outward flow therethrough.

A further object is to hinder, or in certain instances, actually prevent, reversal of the flexible sleeve check valve under conditions of back-pressure thereagainst.

In accomplishing the above objects, an outstanding feature of the invention resides in the provision of check valve means normally closing one end of a shouldered flexible sleeve member, and being effective, under conditions of back-pressure, to telescope slightly within the flexible sleeve member and to force the adjacent portion of such flexible sleeve member outwardly while remaining in closed condition.

This application constitutes a continuation in part of my copending application, Serial No. 347,673, filed July 26, 1940, entitled Syphon breakers and valves, which matured into Patent No. 2,270,737 on January 20, 1942, and, further, a continuation in part of my co-pending application Serial No. 410,139, filed September 9, 1941, also entitled Syphon breakers and valves.

Further objects and features of the invention will be apparent from the following detailed description of the several specific embodiments illustrated in the accompanying drawing.

In the drawing:

Fig. 1 represents a vertical section taken centrally through a preferred form of vacuum breaking device which includes one advantageous embodiment of novel flexible sleeve check valve pursuant to the invention, the sleeve valve being illustrated in the closed position which follows normal flow of liquid therethrough, and with a residual quantity of the liquid retained by the cup formation thereof; indicated by dotted lines is the telescoped and expanded position of the sleeve valve under conditions of back-flow whereby the air vents are closed off against outward spurting or back-flow therethrough;

Fig. 2, a view corresponding to that of Fig. 1, but illustrating the flexible sleeve check valve in its open position accommodating normal liquid flow therethrough, and the air vents of the vacuum breaking device closed off by the bulged flexible sleeve member of the check valve;

Fig. 3, a horizontal section taken on the line 3—3, Fig. 1;

Fig. 4, a perspective view, looking upwardly from below, of the flexible sleeve check valve, per se, of Figs. 1, 2, and 3;

Fig. 5, a vertical section similar to that of Fig.

1, but considerably reduced in size, and illustrating a somewhat different form of the flexible sleeve check valve per se;

Fig. 6, a view similar to that of Fig. 5, but again illustrating a different form of the flexible sleeve check valve per se;

Fig. 7, a side elevation of another embodiment of flexible sleeve check valve, per se, which possesses a different form of check valve means normally closing the lower end of the flexible sleeve, and is capable of use in the vacuum breaking device of Figs. 1, 2, and 3;

Fig. 8, a vertical section taken on the line 8—8, Fig. 7;

Fig. 9, a view similar to that of Fig. 7, but illustrating a still different embodiment of flexible sleeve check valve per se capable of use in the vacuum breaking device of Figs. 1, 2, and 3, the check valve means normally closing the lower end of the flexible sleeve being of a type which absolutely precludes reversal of the valve under conditions of back pressure; and Fig. 10, a vertical section taken on the line 10—10, Fig. 9.

As is indicated by the drawing, the generic characteristics of the flexible sleeve check valve of the invention may be embodied in a variety of specific forms, each having specific features of value in connection with the generic features.

The sleeve valves are especially suited for combination with other structural elements to form vacuum breaking devices, possessing novel functional characteristics, for use in plumbing systems. The vacuum breaking device of Figs. 1, 2, and 3 is merely an example.

The form of flexible sleeve check valve illustrated in the structural combination of Figs. 1, 2, and 3 is shown per se in Fig. 4, and comprises a flexible sleeve member 10, shouldered at its lower end and provided at its upper end with an outwardly extending flange 11, adapted for engagement with the valve casing formed by the other structural elements of the combination. Closing the shouldered lower end of the flexible sleeve member 10 is flexible check valve means, which normally closes the lower end of the sleeve and completes a cup formation for the flexible check valve as a whole.

The check valve means assume various formations in the various embodiments, but each is adapted to effect the desired telescopic action within the lower end of its associated flexible sleeve member 10, and each is so associated with its flexible sleeve member that the latter is shouldered circumferentially of its lower end.

In the present instance, the check valve means is itself of cup formation, and comprises a flexible sleeve member 12 of less diameter than the flexible sleeve member 10, being connected to the lower end of the latter by means of the shoulder connecting member 13. Forming the bottom of this cup formation is a transverse flexible diaphragm 14, which is diametrically slit, as at 15. Coacting flexible lips 16, 16 border the slit 15 and extend outwardly of the cup formation for opening action under conditions of flow through the valve from the upper open end of flexible sleeve member 10, and for closing action under conditions of no fluid flow or of back-pressure against the under side of the sleeve valve.

It is preferred that the secondary or lower sleeve member 12, the transverse diaphragm 14, and the coacting lips 16, 16 have greater wall thicknesses than the flexible sleeve member 10, the wall thickness of the flexible sleeve member 10 being such as will readily yield under even slight pressures. The wall thickness of the shoulder member 13 may be substantially equal to that of the sleeve member 10, as shown, or may be thicker.

The above described sleeve valve may have a rigid spider element 17 inserted into its open upper end to add rigidity to the flange 11, and to aid in positioning the valve within the casing element of the vacuum breaking device. Such spider 17 also insures against reversal of the valve.

In assembling the vacuum breaking device of Figs. 1, 2, and 3, the flexible sleeve check valve of Fig. 4 is inserted into the upper, ported end of the tail piece or outlet piping 20 with its flange 11 resting upon the outwardly extending flange 21 of such tail piece. A coupling nut 22, having an internally extending annular shoulder 23, is slipped up the tail piece 20 from below so that its shoulder 23 contacts and supports the flange 21, thus supporting the valve. The coupling nut 22 is screwed onto the supply piping, or flush valve outlet, 24, tightly clamping the spider 17 and rim 11 of the flexible check valve.

The ports 25 of the tail piece or outlet piping 20 are disposed substantially centrally of the length of the flexible sleeve member 10 of the sleeve valve as installed in the casing, and, thus, are in position to be closed by outward bulging of the walls of such flexible sleeve member 10. The coupling nut 22 has a depending apron 26 spaced apart from the ported portion of the tail piece 20 and extending downwardly past the ports 25, protectively covering the same. Such depending apron 26 defines a circumferential opening 27 which provides communication of the ports 25 with the atmosphere, thus enabling such ports to function as air vents for the vacuum breaking device.

The flexible sleeve check valve of the vacuum breaking device normally rests in the position shown in full lines in Fig. 1. Normal flow of liquid from the supply portion of the system, as indicated by arrows in Fig. 2, opens the flexible check means—here, the diaphragm 14 and coacting lips 16, 16—permitting flow therethrough. Because of the formation of the flexible check valve, a certain quantity of the liquid flow impinges against the upper and inner surfaces of the diaphragm 14, as well as of the shoulder member 13, and backs-up against the inner surface of flexible sleeve member 10, bulging such sleeve member 10 outwardly into pressure closing contact with those wall portions of tail piece or outlet piping 20 which define the ports or air vents 25. Such ports or air vents 25 are thereby tightly closed against undesirable outflow of liquid therethrough during normal operation of the system.

When the flexible check valve recloses after the above-described liquid flow, it retains, by reason of its cup formation, a quantity of liquid 28, see Fig. 1. Such quantity of liquid 28, remaining static in the valve, is an effective aid in the operation of the valve under conditions of back-flow against the underside thereof.

Back pressure may be caused in other ways than by a vacuum effective in the supply portion of the plumbing system, as, for instance by an actual back-flow of liquid against the underside of the valve in its normally closed position. The outlet served by the tail piece or outlet piping 20 may become restricted due to accumulation of waste or other stoppage, and, therefore, may not pass the normal quantity of liquid which flows through the system. Accordingly, the excess liquid will back up against the flexible check valve. Again, such outlet, as in the case of a flexible hose, may be raised to a location above the flexible check valve, and, when the supply of liquid is shut off from its source, residual water will back-up against the flexible check valve. Under such circumstances, the check valve means will be pressed tightly closed, preventing back-flow through the sleeve valve into the supply portion of the system, and will telescope upwardly and inwardly of the flexible sleeve member 10 and expand or bulge such sleeve member outwardly, somewhat in the manner illustrated by the dotted lines of Fig. 1, to completely close off the air ports or vents 25. Thus, there can be no spurting or back-flow through such air ports or vents 25 under circumstances where liquid actually backs-up against the under-surfaces of the sleeve valve.

If and when a vacuum occurs in the supply portion of the plumbing system, there can be no back-flow though the flexible sleeve check valve because of the inherent check characteristics thereof. Further, the inrush of air through the air ports or vents 25 will collapse the flexible sleeve member 10 inwardly so that the upward and inward telescoping action of the check valve means, as aforedescribed, will not result in the closing off of such air ports or vents, but will, on the other hand, greatly hinder the tendency for the sleeve valve to reverse under the suction effective thereon. Accordingly, the air ports or vents 25 will be open and effective to admit air below the closed valve and to thereby dissipate any suction effect which might occur at that location in the system should any accidental failure of the valve or stoppage thereof prevent an effective closure against back-flow.

Briefly comparing the other illustrated forms of flexible sleeve check valves with that aforedescribed for the purpose of correlating the essential characteristics thereof in terms of structure, it is noted that the form of Fig. 5 is essentially similar to that of Figs. 1 through 4, with the exception that the shoulder member, which connects the lower sleeve member to the upper sleeve member, lies at an angle to the horizontal, and, in effect, may be likened to the lateral circumferential wall of the frustum of a cone, converging upwardly and diverging downwardly. Members of this form of valve are designated to correspond with like members of the form of Figs. 1 through 4, the suffix *a* being added to distinguish between the two forms. Thus, 10*a* indicates the upper flexible sleeve, 12*a* the lower, 13*a* the shoulder connecting member, etc.

The form illustrated in Fig. 6 is similar to the forms of Figs. 1 through 4, and of Fig. 5, with the exception that the shoulder connecting member lies at a different angle to the horizontal, being, in effect, the lateral circumferential wall of a downwardly converging and upwardly diverging frustum of a cone. Members of this form of valve are designated as explained with respect to Fig. 5, a *b* suffix being added rather than an *a* suffix. The shoulder connecting member here, then, is designated 13*b*.

The forms of flexible sleeve check valve described above, and illustrated in Figs. 1 through 4, Fig. 5, and Fig. 6, respectively, may have their shoulder members considerably less pronounced, in practice, than is illustrated, and still function effectively in accordance with the teachings of the invention. Too, the relative wall thicknesses of the several members of the respective illustrated forms may be substantially the same without seriously altering the functional characteristics of the valves. Also, in certain instances it may be found desirable to have both the upper and lower sleeve members and the shoulder member of substantially equal wall thickness, and the transverse check diaphragm of a greater thickness.

The flexible sleeve check valve of Figs. 7 and 8 possesses the generic characteristics of the invention, but presents a somewhat different appearance structurally. Here, there is a flexible sleeve member 30 corresponding to the flexible sleeve member 10 of Figs. 1, 2, 3, and 4, and a flange 31 extending outwardly thereof circumferentially of its upper end to provide a securing rim, the same corresponding with the flange 11 of the prior figures. The shouldered portion 32 of this embodiment is disposed at the lower end of the flexible sleeve member 30, extending inwardly circumferentially thereof, but merges into the transverse flexible diaphragm 33 which forms the bottom of the cup formation provided by the valve as a whole. The transverse flexible diaphragm 33 is slit diametrically, as at 34, and coacting flexible lips border such slit, extending outwardly of the cup formation in the same manner as the coacting flexible lips 16, 16 of the prior embodiments extend outwardly of the cup formation provided by the check valve means of that embodiment. As thus formed, the valve is very similar to those disclosed in my aforesaid co-pending applications, Serial Nos. 410,139 and 347,673. It differs therefrom, however, by reason of the fact that its coacting flexible lips are split transversely across their lengths substantially centrally thereof, providing two pairs of end-to-end aligned flexible coacting lips 35, 35 and 36, 36 respectively, to the end that this embodiment of valve will function in accordance with the principles of the instant invention.

The transverse flexible diaphragm 33 and pairs of coacting flexible lips 35, 35 and 36, 36, respectively, make up the check valve means of this embodiment of valve; and, under the pressure of actual back-flow in the system, telescope upwardly and inwardly of the flexible sleeve member 30, forcing the lower circumferential portion of such flexible sleeve member outwardly, as indicated by the dotted lines of Fig. 7, in the same manner as the flexible sleeve member 10 of the prior embodiment is forced outwardly by the upward and inward telescoping of its check valve means, as illustrated in Fig. 1. The transverse slit 37, which divides the ordinary coacting flexible lips into two pairs, enables the flexible check means of this embodiment to buckle, somewhat, at its center in providing for the upward telescopic movement thereof.

Under conditions of normal flow, this embodiment of sleeve valve bulges outwardly, and opens, as indicated by the dotted lines in Fig. 8.

The embodiment of flexible sleeve check valve illustrated in Figs. 9 and 10 is best derived by actually reversing a sleeve valve which is very similar to those disclosed in my aforesaid co-pending application and, also, to the one illustrated in Figs. 7 and 8, such reversal providing a valve having the essential structural characteristics of the invention. The only differences between the valve illustrated in Figs. 7 and 8 and that which is reversed to form the valve of Figs. 9 and 10 reside in greater length of the flexible sleeve member of the latter, and in solid, rather than the transversely split, coacting flexible lips of the latter. The resulting sleeve valve possesses, as is illustrated in Figs. 9 and 10, the generic characteristics of the invention, and, in addition, is absolutely safeguarded against reversal due to suction in a piping system. The flexible sleeve member 40 corresponds to the flexible sleeve members 10 and 30 of the prior embodiments, respectively; the securing rim 41 to the securing rims 11 and 31 of the prior embodiments, respectively; the shouldered portion 42 to the shoulders 13 and 32 of the prior embodiments, respectively; and the check valve means to the check valve means of the prior embodiments. Here, the check valve means comprises a transverse flexible diaphragm 43, which, as in the case of the embodiment of Figs. 7 and 8, substantially merges with the shouldered portion 42; coacting flexible lips 44, 44, which border the diametrical slit 45 of the transverse diaphragm 43 and extend outwardly of the cup formation provided by the flexible sleeve member 40 and the transverse diaphragm 43; and a tubular extension 46 of the coacting flexible lips 44, 44, the latter presenting its edges downwardly toward the direction of back-flow.

The above embodiment of sleeve valve has been found to operate in accordance with the generic principles of the invention and to also positively resist reversal due to suction in the plumbing system, this latter effect being apparently due to the tubular extension 46 of the coacting flexible lips 44, 44.

In addition, a flexible tubular sleeve valve such as that shown in Figs. 1 and 2 of my co-pending application, Serial No. 347,673, or that shown in Figs. 1 and 2 of my co-pending application, Serial No. 410,139, will operate in accordance with the generic principles of the invention.

All of the aforedescribed flexible sleeve check valves are advantageously molded from a good quality rubber so that all the component members thereof are integral, resulting in a completely integral valve, possessing desirable resilience.

Whereas this invention has been described with respect to certain specific embodiments thereof, it should be understood that various changes may be made in such specific embodiments and various other specific embodiments may be constructed by those skilled in the art without departing from the spirit and generic purview of the invention as set forth herein and in the claims which here follow.

I claim:

1. A sleeve valve formed of flexible material capable of resuming normal shape after being deformed, comprising a shouldered sleeve member, and check valve means secured to the shouldered portion of said sleeve member, said check valve means including a transversely extending, slit, flexible diaphragm member, and coacting flexible lip members, and arranged for limited telescopic movement upwardly and inwardly of said shouldered sleeve member under condition of fluid pressure exerted against the under-side of said check valve means, whereby said shouldered sleeve member is bulged outwardly circumferentially.

2. A sleeve valve formed of flexible material capable of resuming normal shape after being deformed, comprising a shouldered sleeve member, and check valve means secured to the shouldered portion of said sleeve member, the said shouldered portion of the sleeve member extending inwardly of said sleeve member at and circumferentially of the lower end thereof, and said check valve means including a sleeve member having lesser diameter than the first-named sleeve member and secured at its upper end to the inner edge of said shouldered portion, a transversely extending, slit, flexible diaphragm member secured to the lower end of said sleeve member of lesser diameter, and coacting flexible lip members, said check valve means arranged for limited telescopic movement upwardly and inwardly of said shouldered sleeve member under condition of fluid pressure exerted against the under-side of said check valve means, whereby said shouldered sleeve member is bulged outwardly circumferentially.

3. A sleeve valve formed of flexible material capable of resuming normal shape after being deformed, comprising a shouldered sleeve member, and check valve means secured to the shouldered portion of said sleeve member, said check valve means including a transversely extending, slit, flexible diaphragm member which substantially merges with said shouldered portion of the sleeve member, and coacting flexible lip members bordering the slit of said diaphragm member and extending outwardly of said sleeve member, said lip members being split transversely thereacross substantially centrally thereof to form two pairs aligned end-to-end, said check valve means arranged for limited telescopic movement upwardly and inwardly of said shouldered sleeve member under condition of fluid pressure exerted against the under-side of said check valve means, whereby said shouldered sleeve member is bulged outwardly circumferentially.

4. A sleeve valve formed of flexible material capable of resuming normal shape after being deformed, comprising a shouldered sleeve member, and check valve means secured to the shouldered portion of said sleeve member, said check valve means including a transversely extending, slit, flexible diaphragm member which substantially merges with said shouldered portion of the sleeve member, coacting flexible lip members bordering the slit of said diaphragm member and extending outwardly of said sleeve member, and a flexible tubular extension of said lip members, said check valve means arranged for limited telescopic movement upwardly and inwardly of said shouldered sleeve member under condition of fluid pressure exerted against the under-side of said check valve means, whereby said shouldered sleeve member is bulged outwardly circumferentially.

5. A vacuum breaking device comprising a valve casing provided with an inlet, an outlet, a flow passage extending from said inlet to said outlet, and air ports extending circumferentially therethrough intermediate the said inlet and the said outlet, and a flexible sleeve check valve suspended within said valve casing adjacent said air ports and extending completely across said flow passage for controlling flow therethrough, said sleeve valve being formed of flexible material capable of resuming normal shape after being deformed, and comprising a shouldered sleeve member, and check valve means secured to the shouldered portion of said sleeve member, said check valve means including a transversely extending, slit, flexible diaphragm member, and coacting flexible lip members, and arranged for limited telescopic movement upwardly and inwardly of said shouldered sleeve member under condition of fluid pressure exerted against the underside of said check valve means, whereby said shouldered sleeve member is bulged outwardly circumferentially closing off said air ports.

6. A check valve comprising a tubular casing having apertures through the wall thereof, a sleeve member disposed within said tubular casing, said sleeve member being formed of flexible material adapted to be circumferentially bulged into contact with the wall of said tubular casing to close said apertures, said sleeve having the property of resuming normal shape after such deformation, and a check valve member attached to said sleeve member and having a portion exposed to pressure within said tubular casing, the check valve member being of smaller diameter than the sleeve member and normally disposed exteriorly of said sleeve member, said check valve member being arranged to telescope within the sleeve member under fluid pressure exerted against said check valve member whereby said sleeve member is bulged outwardly circumferentially into engagement with the wall of the tubular casing to close said apertures.

7. A check valve as defined in claim 6, wherein the check valve member is also formed of flexible material, said check valve member being of less flexibility than the material of the sleeve member.

8. A check valve, comprising a relatively thin-walled flexible tubular portion, and flexible check valve means disposed at and integral with the bottom of said tubular portion and offset with respect thereto, said check valve means including a side wall of less diameter and substantially greater wall thickness than said tubular portion whereby the relative wall thickness of the respective tubular portion and check valve means will permit said check valve means to be telescoped upwardly and inwardly of said tubular portion, with a concomitant circumferential outward bulging of said tubular portion.

JESSE D. LANGDON.